G. A. WENDT.
AUTOMOBILE HEADLIGHT.
APPLICATION FILED JUNE 28, 1920.

1,391,229.

Patented Sept. 20, 1921.

Inventor
Gustave A. Wendt

By Herbert E. Smyth
Attorney

UNITED STATES PATENT OFFICE.

GUSTAVE A. WENDT, OF SPOKANE, WASHINGTON.

AUTOMOBILE-HEADLIGHT.

1,391,229.  Specification of Letters Patent.  Patented Sept. 20, 1921.

Application filed June 28, 1920. Serial No. 392,361.

*To all whom it may concern:*

Be it known that I, GUSTAVE A. WENDT, a citizen of the United States, residing at Spokane, in Spokane county and State of Washington, have invented certain new and useful Improvements in Automobile-Headlights, of which the following is a specification.

The present invention relates to improvements in automobile headlights and contemplates an improved device for attachment to existing lamps, projected from the front thereof and designed particularly for the purpose of directing the light rays from the lamp in the proper direction to achieve the most efficient and effective distribution of the light, and at the same time affording a non-glare headlight to avoid dazzling the eyes of the operator of an approaching vehicle, or of a pedestrian.

To this end the invention consists in the combination with a standard automobile head light of a casing or hood projected from the front of the headlight lamp and provided with means for illuminating the roadway directly in front of the moving vehicle, and with means for insuring the passage of a beam of light, for distant illumination, forwardly, on a plane parallel with the longitudinal axis of the lamp, thus obscuring from the eyes of a person in front of the lamp the direct, dazzling rays of the lamp, at all times, except when the eye is directly in line with the longitudinal axis of the lamp.

By this distribution of the light rays most of the glare from direct rays of the lamp is eliminated, and provision is made for lateral distribution of the light rays and from the lamp or front of the hood for distant illumination, as set forth in my co-pending application for patent Ser. No. 392,362, June 28, 1920.

In the present invention I have improved certain features of the device whereby distant illumination is accomplished and the roadway directly in front of the automobile may be lighted by properly directed rays.

In the drawings herewith forming a part of this specification—

Figure 1:
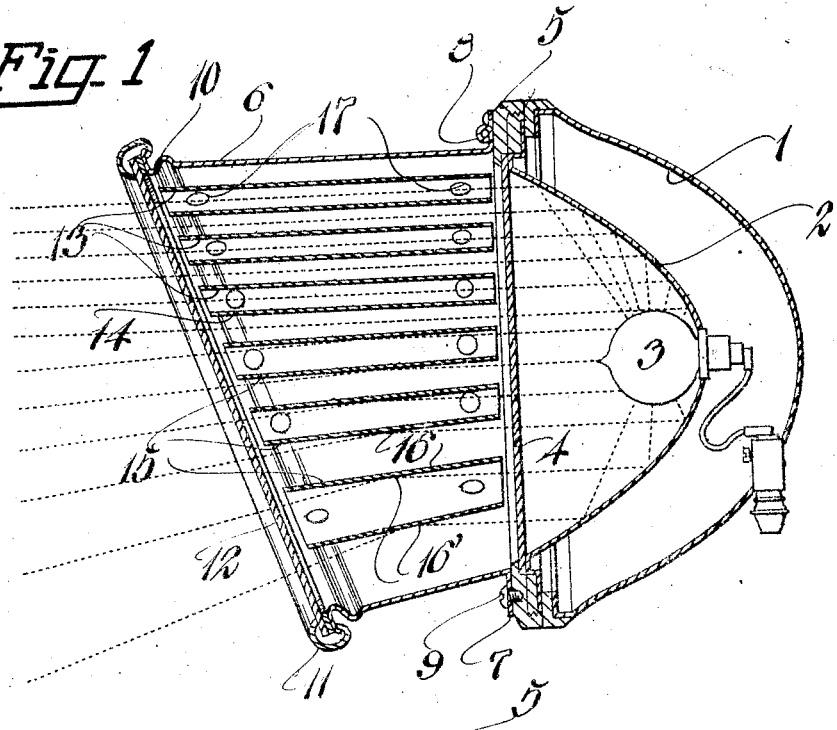
Figure 1 is a vertical, longitudinal sectional view of a headlight of standard type having the projector or mask of my invention attached thereto.

In the preferred form of the invention as illustrated in the drawings a conventional form of automobile headlight lamp is employed comprising the outer metallic shell 1 of approved form, and the inner, reflecting casing 2 for projecting the light rays from the lamp 3 shown as an electric light bulb, and the lamp is equipped with the usual glass 4. The glass is retained by the front plate or ring 5 of the lamp, preferably circular in outline, and the front plate of the lamp is utilized for the attachment of the device.

Figure 2:
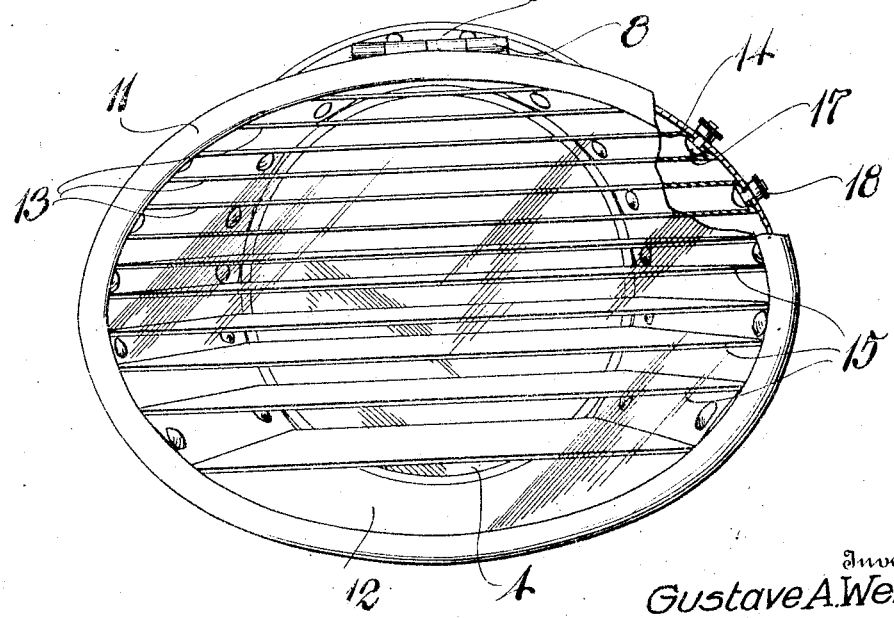
Fig. 2 is a front view of the headlight of Fig. 1 with parts broken away for convenience of illustration.

As shown in the drawings, the mask comprises a tubular metallic hood or casing 6, which at its rear end is circular in cross section, and at its front end as seen in Fig. 2, merges into an elliptical form in cross section, the vertical or shorter diameter of the ellipse being approximately the same as the diameter of the rear end of the hood, and the longitudinal or major diameter of the ellipse being of sufficient length to insure a lateral distribution of the light rays, as well as direct forward projection of the light rays from the lamp 3 of the headlight. At the rear the tubular casing is fashioned with an outwardly projecting flange 7, abutting against the front plate 5 of the headlight, and preferably a hinge 8 is provided at the top of the hood whereby the attachment may be swung away from the headlight, when the fastening screw 9 is freed, to give access to the interior of the hood without detaching the device from the headlight.

Near the front face of the hood or casing an annular bead 10 is provided for strengthening and bracing the same, and at 11 the front edge of the hood is flanged and curled over to form retaining means for the hood lens 12.

Within the hood and extending transversely thereof are provided horizontally disposed, flat plates with reflecting surfaces for directing the light rays received from the reflector 2 of the lamp, and other plates for guiding the light rays directly forward for distant illumination and further for preventing upward distribution of the light rays. These flat plates are preferably made up in pairs, fashioned from blanks properly cut to form and designed to occupy a predetermined position in the hood in their relation to the lamp or its reflector. Thus the three upper tubular metallic members 13 have their flat plates 14 arranged in horizontal position and are perpendicular to the vertical axis of the lamp to which the hood is attached, in order that the light rays emanating from the lamp may be reflected from the polished surface of the reflector 2, and projected directly forward as indicated in dotted lines, for distant illumination.

It will also be apparent that the plates 14 will be instrumental in preventing upward distribution of the light rays, thus eliminating undesirable waste of light and concentrating the light beams for forward distribution and distant illumination where needed.

The lower group of tubular members 15, in the casing or hood are designed, by their reflecting plates 16 to direct the light rays from the lamp forwardly and downwardly, directly in front of the automobile, and laterally thereof, the lateral distribution being accomplished by the elliptical formation of the hood at its front end. The members 15 are fashioned with plates 16, but only the undersurface 16′ of each plate is a reflecting surface, the upper surface of each of these plates being blackened to prevent distribution of the light rays in an upward direction. It will be noted that the lower group of reflecting devices or plates are arranged at an angle to the vertical plane of the headlight, the degree of angularity increasing from the upper to the lower reflecting device for the purpose of directing light rays to the ground directly in front of the automobile. Thus the light rays as shown by dotted lines emanating at the lamp are reflected from the reflector 2 and strike the undersurface or reflecting surface 16′ of these reflecting plates with the result that the rays are directed as shown in dotted lines to illumine the roadway directly at the front and side of the moving automobile. These reflecting and guide plates are fashioned in tubular form and secured at their ends to the wall of the hood or casing, as by rivets or bolts 17 and exterior nuts 18, the under surface 16′ of the plates of the lower group being highly polished reflecting surfaces and the upper surfaces of these plates being non-reflecting surfaces, while the plates of the upper group of members perform the function of directing the light rays forward and prevent upward distribution of the light. It will be noted that the spaces between the plates of the lower group of reflecting devices increase from the top member of the group to the lowermost member in order to adapt these reflecting surfaces to the proper and correct relationship of the varying reflecting surface of the reflector 2, and the formation of the hood, which is shorter at the bottom than at the top, provides for variation in length of the plates, the longer plates being located at the top of the hood.

What I claim is—

The combination with a headlight and lamp, of a hood attached to the lamp, a group of fixed, horizontally arranged and regularly spaced tubular members forming flat plates within the hood for distant distribution of light rays, and a group of angularly disposed tubular members forming flat reflecting plates, each of said plates having an under reflecting surface for direct illumination of the roadway in the immediate vicinity of the lamp.

In testimony whereof I affix my signature.

GUSTAVE A. WENDT.